United States Patent
Herrmann et al.

(10) Patent No.: US 6,444,352 B1
(45) Date of Patent: Sep. 3, 2002

(54) SPOTWELD AND SNAP FIXTURE FOR BATTERY HOUSING

(75) Inventors: Amy Terese Herrmann, Penang (MY); Elizabeth Anne Taylor, Atlanta, GA (US)

(73) Assignee: Motorola, Inc., Schaumburg, IL (US)

( * ) Notice: Subject to any disclaimer, the term of this patent is extended or adjusted under 35 U.S.C. 154(b) by 97 days.

(21) Appl. No.: 09/713,906

(22) Filed: Nov. 16, 2000

(51) Int. Cl.⁷ .................................................. H01M 2/10
(52) U.S. Cl. .............................. 429/96; 429/97; 429/99; 429/151; 29/623.1; 29/730
(58) Field of Search ................................ 429/96, 97, 99, 429/100, 149, 151; 29/623.1, 623.4, 730

(56) References Cited

U.S. PATENT DOCUMENTS 5,928,809 A * 7/1999 Ju ............................. 429/100
6,117,575 A * 9/2000 Dinsdale ......................... 429/1
6,136,467 A * 10/2000 Phelps, III et al. ........... 429/97
6,232,013 B1 * 5/2001 Clarke et al. ............... 429/100

* cited by examiner

Primary Examiner—Patrick Ryan
Assistant Examiner—R Alejandro
(74) Attorney, Agent, or Firm—Philip H. Burrus, IV

(57) ABSTRACT

A battery housing including a cover that has one or more semi-rigid legs depending outwardly therefrom, and the battery housing also including a battery tray for selectively receiving one or more batteries and one or more flexible circuits. The battery tray has one or more fixtures that provide access to at least one battery and at least one flexible circuit such that the flexible circuit can be spot-welded to the battery, and each fixture is placed about the battery tray whereby each of the one or more legs of the cover snap-fits into a fixture and such action preferably affixes the cover to the battery tray to form the battery housing.

4 Claims, 2 Drawing Sheets

SPOTWELD AND SNAP FIXTURE FOR BATTERY HOUSING

TECHNICAL FIELD

The present invention generally relates to battery packs and housings. More particularly, the present invention relates to an improved construction of a battery housing that allows placement of batteries and a flexible circuit within a battery tray, then spot-welding of the circuit to the batteries, and then the snap-fitting of a cover upon the battery tray to create the battery housing.

BACKGROUND OF THE INVENTION

Battery packs and packages are used provide electricity to devices, such as cellular telephones and other portable electronic devices. The battery packs are created from a rigid or semi-rigid battery housing that contains one or more batteries and often a flexible circuit that provides some memory and data communication ability to the battery pack. The battery housing is comprised of one or more rigid or semi-rigid pieces that encapsulate the batteries and flexible circuit(s), if present.

The common method of assembly of a battery pack is to first weld the batteries and flexible circuit(s) together and then placed the structure into a battery tray or other component designed to fit the welded structure. Then a cover, or other component, is rigidly fitted to the battery tray or battery-holding component to form the battery housing. The battery housing is often wrapped or has other modifications performed upon it to create the finished battery pack that is ready for its intended use. However, such method of manufacture creates several problems.

First, the separate step of welding the batteries and flexible circuit(s) requires a further inefficient step of placing the welded structure into the battery tray or battery-holding component, which lengthens the manufacturing process. Second, the welding of the structure outside of the battery-holding component requires a significant tolerance between the welded structure and battery-holding component to ensure that the structure will fit. If the welded structure is too large, the physical placement of the welded battery-flexible circuit structure into the battery-holding component can cause damage to the welded structure. Or, if the welded structure is much smaller than the battery-holding component, the welded structure will not be properly held within the fully assembled battery housing.

Accordingly, it would be advantageous to provide a battery housing that permits the placement of the one or more batteries and flexible circuit into the partially assembled housing and then spot-welding of the circuit to the batteries so that they are held in their preferred arrangement when the battery housing is fully assembled. The present invention is therefore directed to the provision of an improved battery housing that permits spot-welding of a flexible circuit to one or more batteries while the batteries are held within the partially assembled battery housing.

DETAILED DESCRIPTION OF THE INVENTION

Figure 1:
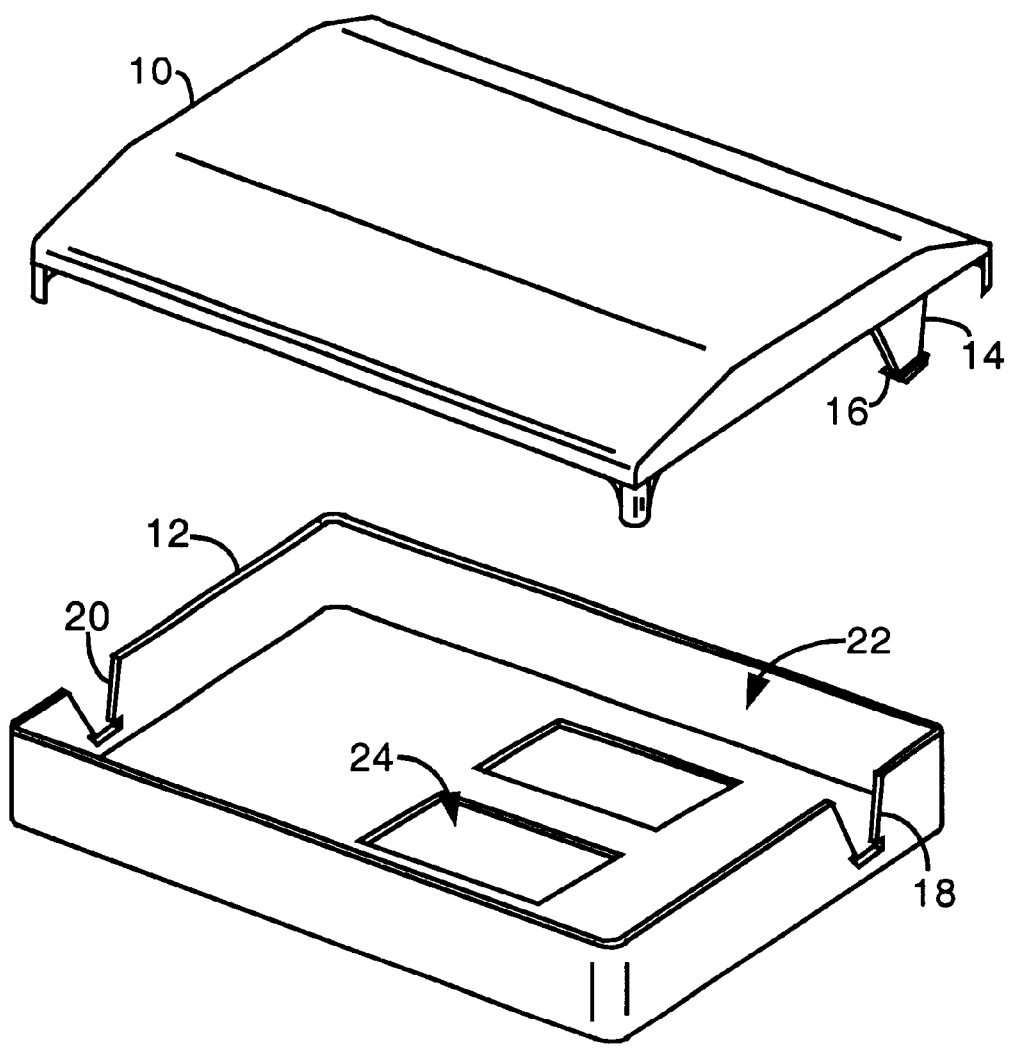
FIG. 1 is a perspective view of the cover in vertical alignment over an empty battery tray, with the snap-fitting legs of the cover vertical aligned with the fixtures of the battery tray.

With reference to the figures in which like numerals represent like elements throughout. FIG. 1 illustrates the cover 10 and battery tray 12 that form the battery housing of the present invention. The cover 10 has one or more semi-rigid legs depending outwardly therefrom, such as leg 14. Leg 14 is shown as downwardly dependent from the cover 10 with a lower extension 16 that allows the leg 14 to snap-fit into the fixture 18 of the battery tray 12. The battery tray 12 is shown as embodied with a pair of fixtures 18 and 20 and each fixture 18 and 20 will receive a leg 14 of the cover 10. The cover 10 is shown in FIG. 1 with the leg 14 (and second leg which is not shown) as vertically aligned over the fixtures 18 and 20 of the battery tray 12 such that the cover 10 is affixed to the battery tray 12 by placing the leg(s) 14 in the fixtures 18 and 20. Other methods and devices can be present to also affix the cover 10 to the battery tray 12 to form the battery housing. However, as shown here, the snap-fitting of the leg(s) 14 into the fixtures 18 and 20 adequately holds the cover 10 to the battery tray 12.

Figure 2:
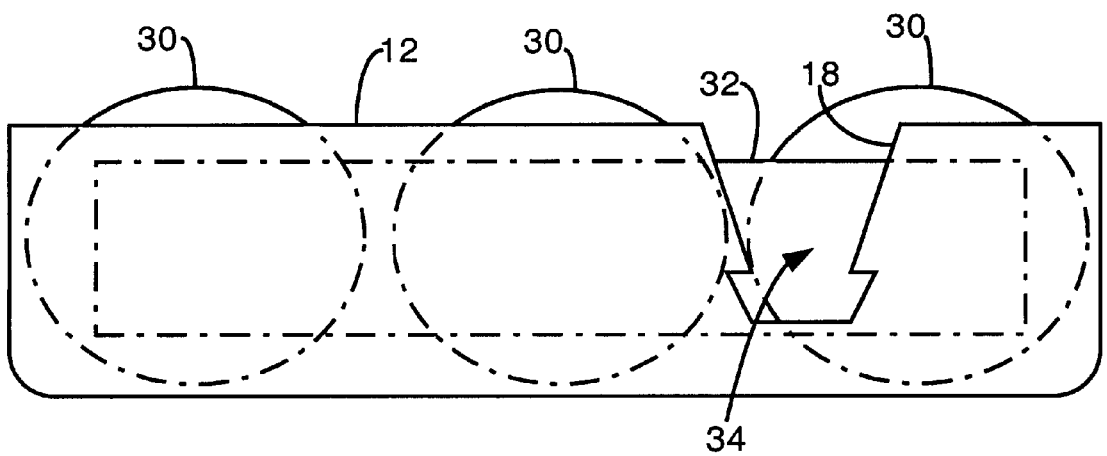
FIG. 2 is an end view of the battery tray illustrating a plurality of the batteries in the tray with a flexible circuit on the end of the batteries, and the flexible circuit is accessible through the fixture to spot-weld the circuit to the batteries.

The battery tray 12 has a battery-holding interior 22, and as shown in FIG. 2, into which is placed one or more batteries 30 and at least one flexible circuit 32 to provide memory and data processing capabilities to the battery housing. The battery tray 12 has one or more fixtures 18 and 20 and each fixture provides access to at least one of the batteries 30 and a flexible circuit 32 such that the flexible circuit 32 can be spot-welded to at least one of the batteries 30. The welding occurs through welding space 34 that is provided by fixture 18 to the flexible circuit 32. Without the welding space 34 provided by each fixture 18 and 20, the flexible circuit 32 would otherwise be welded to the batteries 30 outside of the battery 12 tray and then placed therein. With the present invention, the batteries 30 and flexible circuit 32 are placed in correct alignment and then welded to together to form an intelligent power supply. The method of spot-welding the flexible circuit 32 to one or more of the batteries 30 can be any method that is known in the art, such as thermal, electrical or ultrasonic welding.

Each fixture 18 and 20 is placed about the battery tray 12 such that each of the one or more legs 14 of the cover 10 snap-fits into a fixture 18 and 20 to cover the one or more batteries 30 and form the battery housing. The battery tray 12 can also include one or more openings 24 so that the batteries 30 and/or the flexible circuit 32 can be contacted once the battery housing is formed, i.e. the cover 10 is affixed to the battery tray 12.

It can thus be seen that the inventive cover 10 and housing 12 provides an inventive method to assemble a battery housing. The method particularly includes the steps of placing one or more batteries 30 in a battery tray 12, and placing one or more flexible circuits 32 into the battery tray 12 with the one or more batteries 30. Then the method includes the steps of spot-welding at least one flexible circuit 32 to at least one of the batteries 30, the spot-welding occurring through at least one fixture 18, i.e. welding space 34, and snap-fitting the cover 10 to the battery tray 12 to form the battery housing. The snap fitting occurs from the placement of the one or more legs 14 of the cover 10 into each fixture 18 and 20. Here, it should be seen that the snap-fit is caused by the elastic deformation of the lower extension 16 of semi-rigid leg within the bottom of the fixtures 18 and 20. Other snap-fitting arrangements as are known in the art can be alternately used in the present invention. Further, at least the leg extension 16 is semi-rigid or elastic to allow the snap-fit; however, the composition of the cover 10 and battery tray 12, or any element thereof, can be any material in rigid or semi-rigid form so long so long as the components being used for the snap-fit can elastically deform to achieve the snap-fit.

In the method of assembly as shown in FIG. 2, as plurality of batteries 30 are placed in the battery tray 12, and two flexible circuits (one of which is shown as circuit 32) are placed into the battery tray 12 on the opposite ends of the batteries 30 and accessible at fixtures 18 and 20. Thus, after the step of spot-welding the first flexible circuit (or here circuit 32) to at least one of the batteries 30 through fixture 18, a second step of spot-welding occurs in the second flexible circuit (identical to circuit 32) through fixture 20 to weld the second flexible circuit to at least one of the plurality of batteries 30.

While there has been shown a preferred embodiment of the present invention, it is to be understood that certain changes may be made in the forms and arrangement of the elements and method of assembly without departing from the underlying spirit and scope of the invention as is set forth in the claims.

What is claimed is:

1. A battery housing, comprising:
   a cover including one or more semi-rigid legs depending outwardly therefrom; and
   a battery tray for selectively receiving one or more batteries and one or more flexible circuits, the battery tray including one or more fixtures wherein each fixture provides access to at least one battery and at least one flexible circuit such that the flexible circuit can be spot-welded to the battery, and each fixture placed about the battery tray such that each leg of the one or more legs of the cover snap-fits into a fixture to affix cover over the batteries in the battery tray.

2. The battery of claim 1, wherein the cover is held to the battery tray by the snap-fitting of the one or more legs of the cover into the one or more fixtures of the battery tray.

3. A method of assembling a battery housing, comprising the steps of:
   placing one or more batteries in a battery tray, the battery tray including one or more fixtures;
   placing one or more flexible circuits into the battery tray with the one or more batteries;
   spot-welding at least one flexible circuit to at least one battery, the spot-welding occurring through at least one fixture; and
   snap-fitting a cover to the battery tray to form the battery housing, the cover having one or more semi-rigid legs outwardly depending therefrom, and each leg snap-fitting into one or the one or more fixtures.

4. The method of claim 3, wherein the step of placing one or more batteries in a battery tray is placing a plurality of batteries in the battery tray, and the step of placing one or more flexible circuits into the battery tray is placing a plurality of circuits in the battery tray, and, after the step of spot-welding at least one flexible circuit to at least one battery, further comprising the step of the spot-welding another of the flexible circuits to another of the plurality of batteries.

* * * * *